United States Patent
Palaniswami

Patent Number: 5,260,889
Date of Patent: Nov. 9, 1993

[54] COMPUTATION OF STICKY-BIT IN PARALLEL WITH PARTIAL PRODUCTS IN A FLOATING POINT MULTIPLIER UNIT

[75] Inventor: Krishnan J. Palaniswami, Austin, Tex.

[73] Assignee: Intel Corporation, Santa Clara, Calif.

[21] Appl. No.: 861,077

[22] Filed: Mar. 31, 1992

[51] Int. Cl.$^5$ .................................................. G06F 7/38
[52] U.S. Cl. ...................................... 364/745; 364/748
[58] Field of Search ........................ 364/715.01, 745, 748

[56] References Cited

U.S. PATENT DOCUMENTS

| | | | |
|---|---|---|---|
| 4,928,259 | 5/1990 | Galbi et al. | 364/745 |
| 5,128,889 | 7/1992 | Nakano | 364/748 |

Primary Examiner—Long T. Nguyen
Attorney, Agent, or Firm—Owen L. Lamb

[57] ABSTRACT

A floating point unit multiply logic in which a sticky bit is computed in parallel with partial product generation and reduction for three different rounding precisions and two different operand, ranges. Two sticky bits need to be calculated during the parallel operation because the result can be anywhere between 0 and 4 and it will not be known which is correct until after the result of the multiplication has been calculated. If the result is between 0 and 2, then a first sticky bit is generated. When the result is between 2 and 4, a second sticky bit is generated. It is not known which sticky bit is the correct one to use until the final addition is performed. Once the results of the final addition is known, the correct sticky bit is selected using a carry out from the adder, the overflow bit. If the overflow bit is a 1, then the first sticky bit is selected. If the overflow bit is a 0, then the second sticky bit is selected.

3 Claims, 3 Drawing Sheets

_5,260,889_

COMPUTATION OF STICKY-BIT IN PARALLEL WITH PARTIAL PRODUCTS IN A FLOATING POINT MULTIPLIER UNIT

CROSS REFERENCES TO RELATED APPLIED APPLICATIONS

This application is related to copending patent application Ser. No. 07/861,078 filed Mar. 31, 1992, now U.S. Pat. No. 5,195,051, granted Mar. 16, 1993, of Krishnan J. Palaniswami, entitled "Computation of Sign bit and Sign Extension in the Partial Products in a Floating Point Multiplier Unit," and Ser. No. 07/860,987, filed Mar. 31, 1992, of Jack T. Poon, entitled "Floating Point to Integer Conversion in a Floating Point Adder;" both assigned to Intel Corporation, the assignee of the present invention.

FIELD OF THE INVENTION

The present invention relates to data processing systems, and more particularly to apparatus for the computation of sticky bit in the floating-point unit of a microprocessor.

BACKGROUND OF THE INVENTION

In floating-point operations, the computer is limited by the number of bits it can store for a particular number. Rounding is therefore necessary to adjust a number so that it is accurate to a certain specified precision consistent with the capacity of the computer to store the -number. For example, rounding to even is accomplished by adding one-half of the least-significant digit position of the desired precision to the most-significant digit of the portion that will eventually be discarded. For example, consider the number 38.5XXX (where XXX are additional digits in the number). If XXX>0 (case 1 the rounding is correct to the number 39, because 39 is nearest to 38.5XXX. But if XXX=o (case 2) the rounding is incorrect because it is a tie situation which requires the result to be rounded to even (38). A single bit is used to distinguish between case 1 and case 2. This bit is generated by taking the logical OR of the bits XXX. This bit is called the sticky bit and is given a value of 1 for case 1 and a value of 0 for case 2. The sticky bit is used to distinguish between these two cases where a number, such as 38.5, is rounded to the nearest whole number. The examples above are taken from the book "Introduction to Arithmetic for Digital Systems Designers," by Waser and Flynn, 1982, CBS College Publishing.

In a multiply operation ordinarily the sticky bit cannot be calculated until the result of the multiply has been determined. This results in the need for additional clock cycles to be taken during a multiply operation to determine the sticky bit in seriatim with the calculation of partial products.

It is an object of the present invention to speed up the operation of a floating-point multiply-unit by computing the sticky bit is in parallel with partial product generation.

SUMMARY OF THE INVENTION

Briefly, the above object is accomplished in accordance with the invention by a multiply logic in which a sticky bit is computed in parallel with partial product generation and reduction for three different rounding precisions and two different operand ranges. Two sticky bits need to be calculated during the parallel operation because the result can be anywhere between 0 and 4 and it will not be known which is correct until after the result of the multiplication has been calculated. If the result is between 0 and 2, then a first sticky bit is generated. When the result is between 2 and 4, a second sticky bit is generated. It is not known which sticky bit is the correct one to use until the final addition is performed. Once the results of the final addition is known, the correct sticky bit is selected using a carry out from the adder, the overflow bit. If the overflow bit is a 1, then the first sticky bit is selected. If the overflow bit is a 0, then the second sticky bit is selected.

BRIEF DESCRIPTION OF THE DRAWINGS

The invention will be apparent from the following more particular description of the preferred embodiment of the invention as illustrated in the accompanying drawings, wherein.

DESCRIPTION OF THE PREFERRED EMBODIMENT

Floating Point Multiplier

Figure 1:
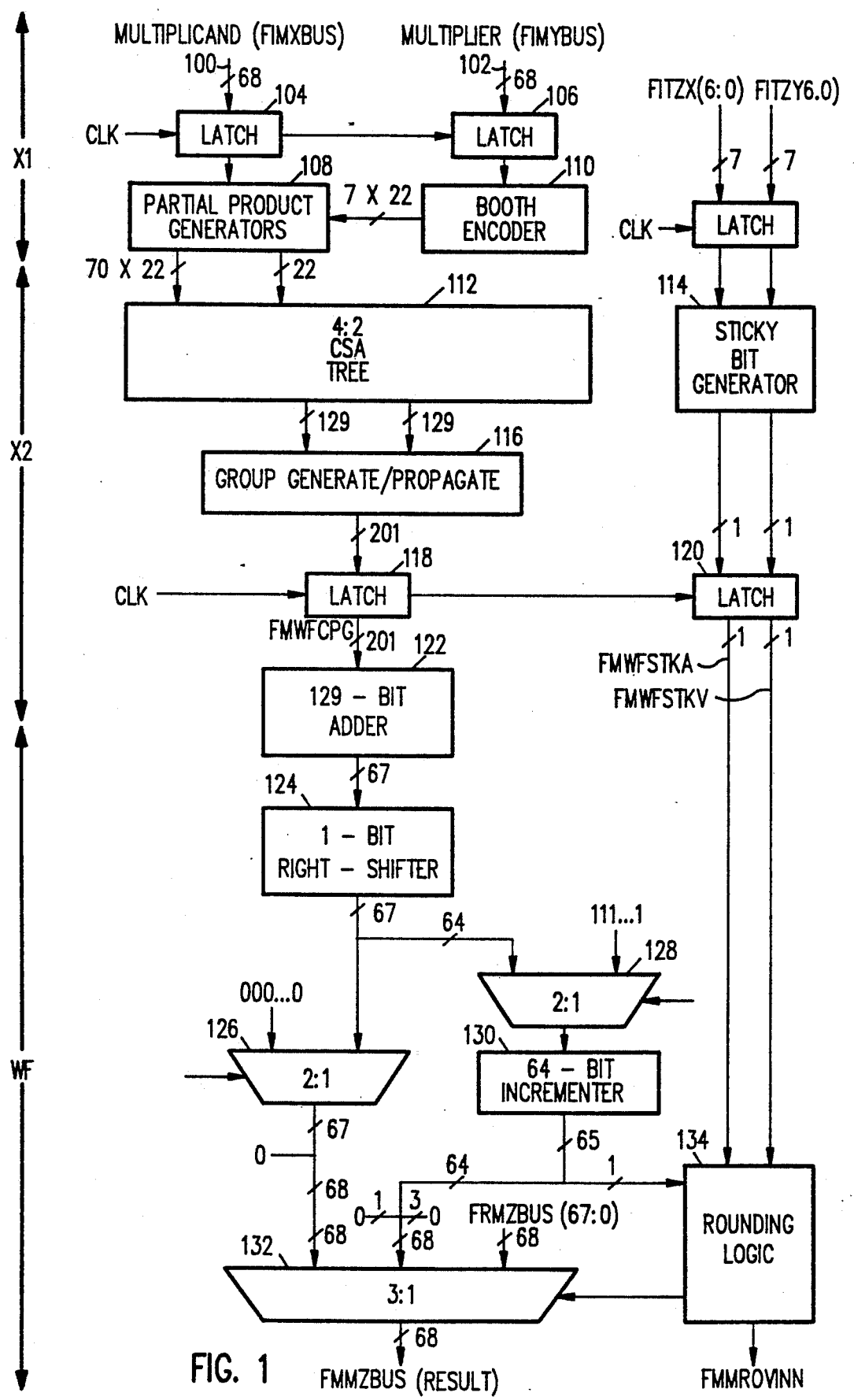
FIG. 1 is a block diagram of a floating point multiply unit in which the invention is embodied.

Refer to FIG. 1. The floating point multiplier unit computes the product of a 67-bit multiplicand and a 64-bit multiplier as more fully described in U.S. Pat. No. 5,195,051, which is incorporated herein by reference. The floating point multiplier is capable of generating rounded results in single, double, and extended precision in three clock cycles that conform to the IEEE standards. It is also capable of performing 32-bit by 32-bit signed/unsigned integer multiplication. The latency of the multiply operation is three clocks. The throughput on multiplies, however, is two clock cycles. The floating point multiplier is heavily pipelined and able to achieve these performance figures by using a parallel multiplication technique and a novel 129-bit adder.

X1 Stage

In the X1 stage, the floating point multiplier generates 22 partial products by booth encoding the 64-bit multiplier. In the X2 stage, the partial products are fed into a 4:2, Carry Save Adder (CSA ) tree (112) for further reduction, eventually producing two vectors called the sum and carry vectors. In the WF stage, these sum and carry vectors are added to compute the final product. Also, rounding is performed (depending on the precision control and rounding mode) using a dedicated rounder (134). The rounded result is then written back onto the result bus (FMMZBUS) at end of WF clock.

The X1 stage consists of booth encoders (110), and partial product generators(108). The inputs to these blocks are the 67-bit multiplicand (100) and 64-bit multiplier (102).

X2 Stage

The X2 stage consists of a 4:2 CSA tree (112) and a sticky-bit generator (114). The inputs to the CSA tree are the partial products. The sticky-bit generator computes the sticky bit for different precision in X2 stage. Two different sticky-bit values are computed, one (FMWFSTKA) when the value of the unrounded product is between 2 and 0, and the other (FMWFSTKV) between 4 and 2, inclusive. The output of this block (114) is the actual value of sticky bits to be used in WF stage.

WF Stage

The WF stage logic consists of a 129-bit summation block (122), a normalizer, a 64-bit incrementer (130), two different mux blocks, and rounding logic (134). The 129-bit summation unit (122) computes the 129-bit sum using the output of the group generate/propagate (116) block, which is latched (118) at the rise of WF clock. The normalizer is a 1-bit right shifter (124) that shifts the rounded result if the value of the unrounded result is between 4 and 2, inclusive. The 64-bit incrementer generates a result equal to the unrounded result plus one. One of the mux blocks is used to replace the lower insignificant bits to the input of the incrementer with ones based on the precision mode. The other mux block replaces the lower insignificant bits in the normalized result with zeros based on the precision mode of the floating point multiply operation. The rounding logic evaluates round condition based on the precision and round mode, sign of the floating point multiplier result, value of least significant bit (LSB), round and sticky bits, and type of multiply operation. The signal FMMROVFNN indicates rounding overflow. The 3:1 mux (132) at the output of the WF stage logic selects either the normalized result from 2:1 mux (126) or the incremented result from incrementer (130) or the result (FRMZBUS) delivered over the result bus from logic (not shown) that performs the rounding and normalization for add and divide logic.

Figure 2:
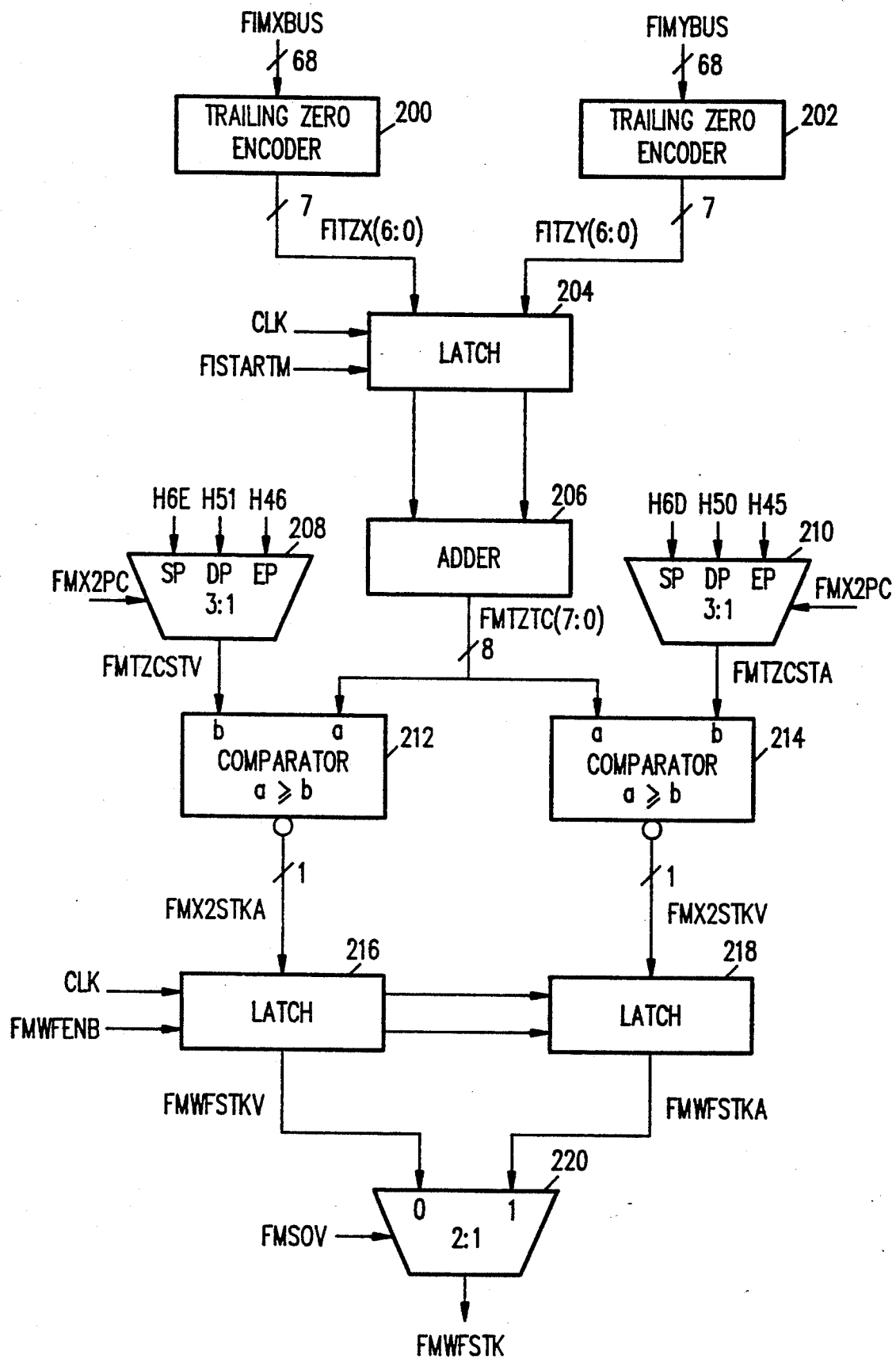
FIG. 2 is a diagram of a the sticky bit generator shown in FIG. 1.

Refer now to FIG. 2 which is a diagram of a the sticky bit generator (114) shown in FIG. 1. FIMXBUS is the multiplicand source bus and FIMYBUS is the multiplier source bus which drive the trailing zero encoder (200) and the trailing zero encoder (202), respectively. The output of the trailing zero encoder (200) and the output of trailing zero encoder (202) are latched in a latch (204). The result of the multiplication that takes place in the logic of FIG. 1 can be anywhere between 0 and 4. There are two operand ranges involved. When the operand is between 2 and 0, then there is one kind of sticky bit which is used to compute the final result. When the operand is between 2 and 4, then there is another kind of sticky bit which is used to compute the final result.

Figure 4:
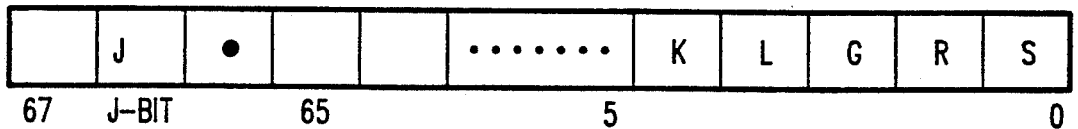
FIG. 4 is a diagram for extending precision floating point number format.

The Intel 80486 microprocessor stores real numbers in a three-field binary format similar to exponential notation. The significant bits of the number are stored in the significant field. An exponent field locates the binary point within the significant digits to determine the number's magnitude. A sign field indicates whether the number is positive or negative. There are three different types of precision in floating point, single precision, double precision, and extended precision. In the single-precision case shown in FIG. 4, the relative positions of the least significant bit of the mantissa before rounding (L), the round (R), and sticky bits (s) are shown.

The sticky bit (S) is computed in parallel with the rest of the hardware. The logic does not wait until the final result is available as shown in FIG. 1. In the prior machines the sticky bit was computed after the result was computed, the output of the 3:1 multiplexer of FIG. 1.

Sticky-Bit Generator

The sticky bit is generated in the floating point multiplier by looking at the trailing zero count of the multiplicand and multiplier. The block diagram of the sticky-bit generator is shown in FIG. 2. The 3:1 mux (208 or 210) selects the correct constant, either a first constant (H6E, H51, H46) or a second constant (H6D, H50, H45), to compare with the trailing-zero count-sum depending on the precision chosen to determine the sticky bit.

Two sticky bits need to be calculated during the parallel operation because the result can be anywhere between 0 and 4 and it will not be known which is correct until after the result of the multiplication has been calculated. If the result is between 0 and 2, then the output line FMWFSTKVA is generated. When the result is between 2 and 4, the output line FMWFSTKV is generated. It is not known which sticky bit is the correct one to use until the final addition is performed. Once the results of the final addition is known, the correct sticky bit can be selected. The carry out from the adder (122), the overflow bit FMSOV, is used to select the sticky bit by energizing the 2:1 multiplexer (220). If the overflow bit is a 1, then the FMWFSTKV bit is chosen. If the overflow bit is a 0, then the FMWFSTKA bit is chosen. The final sticky bit FMWFSTK is then taken from the output of the 2:1 multiplexer.

Principle:

The number of trailing zeros in the product is exactly equal to the sum of the trailing zeros in the operands for any representation in which the base is prime (for example, base two).

The trailing-zero count of both multiplicand and multiplier are summed up in adder (206) and compared in comparators (212 and 214) against a constant based on the precision control. This constant is determined from the number of bits to the right of the round bit (R). If the outcome of the comparison is one, then the sticky bit is zero. Otherwise, the sticky bit is one.

EXAMPLE

Singe-Precision Case

Constant:
= sum of trailing-zero bits + 3 (to account for additional 3 trailing bits in the multiplier)
: = 105 + 3
: = 108
If (trailing-zero sum $\geq$ constant) then
sticky:
= 0
else
sticky:
= 1
Two different constants are needed for the same precision.
(i) constant_1:2.0 < unrounded product < 0
(ii) constant_2:4.0 < unrounded product $\leq$ 2.0
constant_2: = constant_1 + 1

Method of Sticky-Bit Generation

Figure 3:
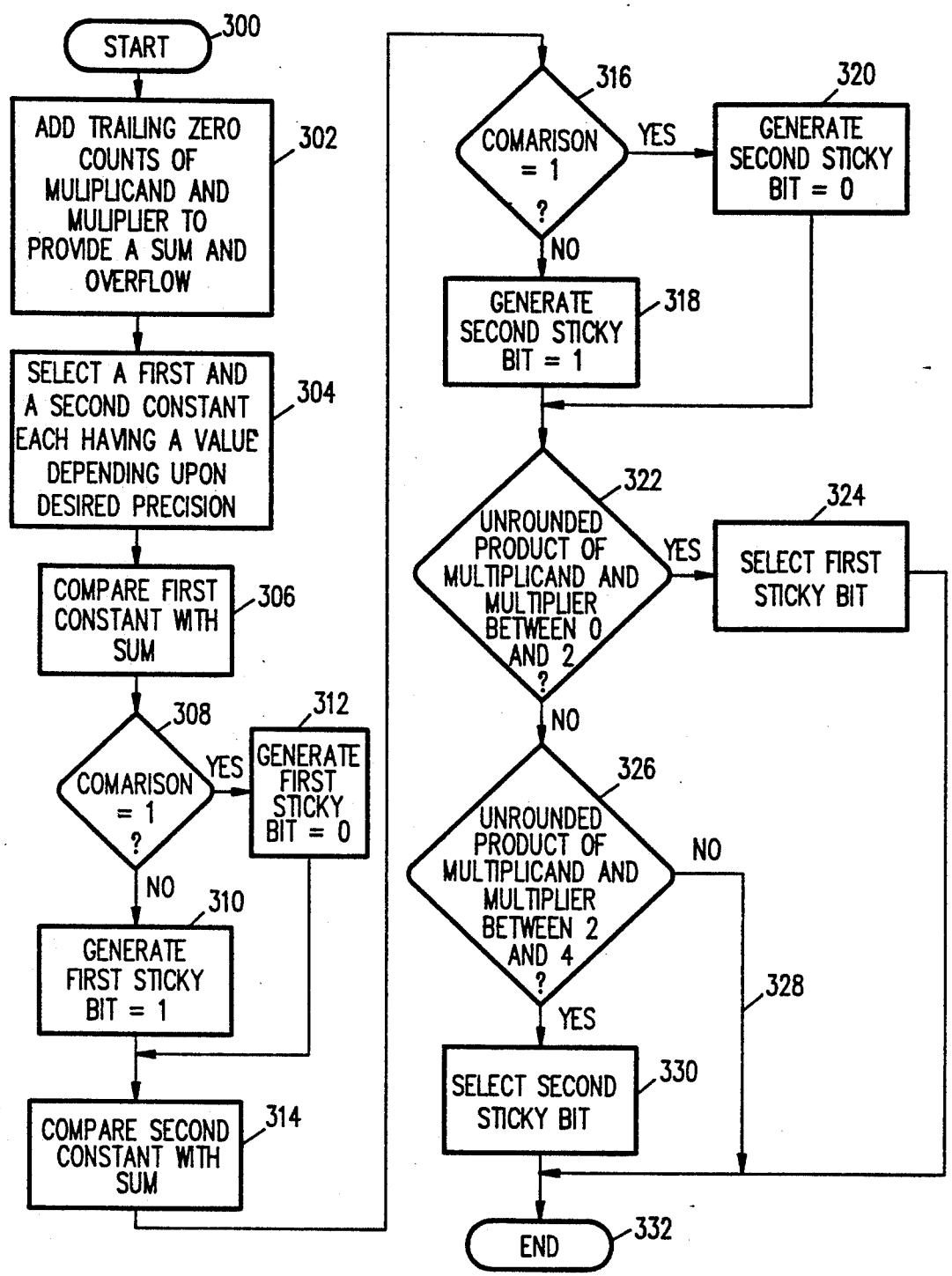
FIG. 3 is a flow diagram of sticky-bit generator is shown in FIG. 2.

The flow diagram of sticky-bit generator is shown in FIG. 3.
(Step 302) The trailing-zero count (200) of multiplicand and the trailing-zero count (202) of multiplier are latched (204) and summed up in adder (206) to provide a first sum (FMTZTC).

(Step 304) a first 3:1 mux (208) selects the correct constant to compare with the trailing-zero count-sum depending on precision chosen to determine the sticky bit; and a second 3:1 mux (210) selects the correct constant to compare with the trailing-zero count-sum depending on precision chosen to determine the sticky bit.

(Step 306) The first sum (FMTZTC) is compared in a comparator (212) against a first constant (FMTZCSTV).

(Step 308) If the outcome of the first comparison is one, then (Step 310) a first sticky bit (FMX2STKA) of one is generated, otherwise, (Step 312) a first sticky bit (FMX2STKA) of zero is generated.

(Step 314) The second sum (FMTZTC) is compared in the second comparator (214) against a second constant (FMTZCSTA).

(Step 316) If the outcome of the second comparison is one, then (Step 318) a second sticky bit (FMX2STKV) of one is generated, otherwise, (Step 320) a second sticky bit (FMX2STKV) of zero is generated.

(Step 322) If the unrounded product of multiplicand and multiplier is between 0 and 2, then (Step 324) the first sticky bit, the output line FMWFSTKA, is selected.

(Step 326) If the unrounded product of multiplicand and multiplier is between 2 and 4, then (Step 330) the second sticky bit, the output line FMWFSTKV, is selected.

While the invention has been particularly shown and described with reference to preferred embodiments thereof, it will be understood by those skilled in the art that the foregoing and other changes in form and detail may be made therein without departing from the scope of the invention.

What is claimed is:

1. A sticky bit generator in a floating point multiplier operating within a chosen precision to multiply floating point numbers comprised of an overflow bit, a mantissa field and an exponent field wherein the relative positions of the least significant bit of the mantissa before rounding are a round bit (R), and sticky bits (S); comprising:

first means for adding a multiplicand trailing-zero count and a multiplier trailing-zero count to produce a trailing-zero count-sum;

second means connected to said first means for selecting a correct constant to compare with said trailing-zero count-sum depending on a precision chosen to determine a sticky bit;

a first comparator means connected to said second means for comparing against a first constant based on said precision control for generating a first sticky bit having a value of zero upon the condition that an output of said comparator is one and having a value of one upon the condition that said output of said comparator is zero;

second comparator means connected to said second means for comparing against a second constant based on said precision control for generating a second sticky bit having a value of zero upon the condition that said output of said comparator is one and having a value of one upon the condition that said output of said comparator is zero;

said first and second constants being determined from the number of bits to the right of said round bit; and, third means responsive to said overflow bit for selecting said first sticky bit and alternatively for selecting said second sticky bit.

2. A method of generating a sticky bit in a floating point multiplier operating within a chosen precision to multiply a multiplicand by a multiplier, said multiplicand and said multiplier each being a floating point numbers comprised of a mantissa field and an exponent field wherein the relative positions of the least significant bit of the mantissa before rounding are a round bit (R), and sticky bits (S), comprising the steps of:

A. summing a trailing-zero count of said multiplicand and a trailing-zero count of said multiplier to provide a first sum;

B. selecting a first constant depending on a first precision chosen to determine a first sticky bit or a second constant depending on a second precision chosen to determine a second sticky bit;

C. comparing said first sum in a first comparator against said first constant;

D. generating, if an output of said first comparator is one, a first sticky bit of one, or a first sticky bit of zero;

E. comparing said second sum in a second comparator against a second constant;

F. generating, if said output of said second comparator is one, a second sticky bit of one, or a second sticky bit of zero;

G. selecting, if an unrounded product of said multiplicand and said multiplier is between 0 and 2, said first sticky bit, and, H. selecting, if an unrounded product of an multiplicand and said multiplier is between 2 and 4, said second sticky bit.

3. A sticky bit generator is a floating point multiplier operating within a chosen precision to multiply floating point numbers comprised of an overflow bit, a mantissa field and an exponent field wherein the relative positions of the least significant bits of the mantissa before rounding are a round bit (R), and sticky bits (S); comprising:

an adder for adding a multiplicand trailing-zero count and a multiplier trailing-zero count to produce a trailing-zero count-sum;

a first mux connected to said adder for selecting a correct constant to compare with said trailing-zero count-sum depending on a precision chosen to determine a sticky bit;

a first comparator connected to said mux for comparing against a first constant based on said precision control for generating a first sticky bit having a value of zero upon the condition that an output of said comparator is one and having a value of one upon the condition that said output of said comparator is zero;

a second comparator connected to said mux for comparing against a second constant based on said precision control for generating a second sticky bit having a value of zero upon the condition that said output of said comparator is one and having a value of one upon the condition that said output of said comparator is zero;

said first and second constants being determined from the number of bits to the right of said round bit; and, a second mux responsive to said overflow bit for selecting said first sticky bit and alternatively for selecting said second sticky bit.

* * * * *